United States Patent

Harnsberger et al.

[15] 3,654,990
[45] Apr. 11, 1972

[54] HYDRAULIC FRACTURING METHOD

[72] Inventors: Bobby G. Harnsberger; Joy T. Payton, both of Houston, Tex.

[73] Assignee: Texaco Inc., New York, N.Y.

[22] Filed: June 19, 1970

[21] Appl. No.: 47,878

[52] U.S. Cl............................................166/281, 166/283
[51] Int. Cl..........................................................E21b 33/138
[58] Field of Search..................................166/276, 281, 283

[56] References Cited

UNITED STATES PATENTS

| 3,208,522 | 9/1965 | Roebuck et al.........................166/283 |
| 3,428,121 | 2/1969 | Harnsberger............................166/276 |
| 2,933,135 | 4/1960 | Johnson...............................166/283 X |
| 3,046,222 | 7/1962 | Phansalkar et al.......................166/283 |

Primary Examiner—David H. Brown
Attorney—Thomas H. Whaley, Carl G. Reis and James F. Young

[57] ABSTRACT

An improved method of fracturing an underground fluid bearing formation penetrated by a well bore for the production of fluids therefrom by injecting a composition capable of forming a fluid permeable barrier in said formation at a pressure sufficient to form fissures therein extending from said well bore, and thereafter maintaining pressure on the composition for a predetermined period to permit the composition to set and form a fluid permeable barrier in the formed fissures.

3 Claims, No Drawings

HYDRAULIC FRACTURING METHOD

The present invention relates to an improved method for the recovery of petroleum from an underground petroleum containing formation.

It is known to use various fluids in fracturing operations for the initiation and/or enlargement of fissures in underground fluid containing formations such as a hydrocarbon bearing formation. In this known procedure, a fluid called the fracturing fluid is pumped into a well bore and forced out into the formation under a pressure sufficient to open up fissures in the formation and/or to enlarge any natural fissures therein. It is desirable to add to the fracturing fluid a propping agent or mixture of such agents to maintain the created and/or enlarged fissures in open position to enhance the flow of formation fluids therethrough into the well bore for subsequent recovery therefrom by conventional recovery techniques. Among known propping agents are solid particles such as sand, walnut shells, glass beads, metal pellets, plastics and the like.

Suitable fracturing fluids include fresh water, brines, gelled water (fresh or brine), gelled acids, and liquid hydrocarbons such as gasoline, kerosene, diesel oil, gas oil and the like, that usually have incorporated therein a bodying or gelling agent such as sodium palmitate.

Amont the disadvantages associated with the known hydraulic fracturing methods using propping agents is the tendency of the formation after being fractured to reseal itself at the induced or enlarged fissures with the result that the propping agents are crushed or forced into the formation and their beneficial effects destroyed.

Another disadvantage is that the propping agents are removed from their locations in the fissures by the flow of formation fluids during subsequent petroleum production operations and their propping function is materially decreased or lost with a resultant loss of production of petroleum fluids.

It has now been found that the above disadvantages can be overcome or materially lessened by the novel fracturing method of the present invention.

An object of the present invention is to provide an improved formation fracturing method.

It is known from commonly assigned U.S. Pat. No. 3,428,121 to treat unconsolidated sandy formations with a treating composition of sand, cement and water in a hydrocarbon carrier oil which sets and forms a permeable cement barrier. The formed cement barrier prevents the movement of unconsolidated sand particles with the flow of formation fluids during producing operations. The disclosure of this patent is herein incorporated by reference.

How these and other objects of the invention are accomplished will become apparent with reference to the accompanying disclosure. In at least one embodiment of the practice of the invention, at least one of the foregoing objects will be achieved.

In accordance with the present invention, the improved method comprises fracturing an underground fluid bearing formation penetrated by a well bore for the production of fluids therefrom by injecting a composition capable of forming a fluid permeable barrier in said formation at a pressure sufficient to form fissures therein extending from said well bore, and thereafter maintaining pressure on the composition for a predetermined period to permit the composition to set and form a fluid permeable barrier in the formed fissures.

The invention in a further aspect also comprises carrying out the fracturing operation with a fracturing fluid such as water, oil or the like, which optionally may contain a propping agent such as sand, glass beads or the like including mixtures thereof, and after the formation has been fractured and optionally propped open, then injecting the composition into same to lock in the propping agent and/or to keep the fissures open by the formed fluid permeable barrier.

An unexpected advantage accruing from this embodiment of the invention is that the placed propping agents are prevented from being washed out of the formed formation fissures by the permeable cement barrier during production of formation fluids with a resultant decrease and/or interruption of production of the desirable formation fluids.

The method of the present invention is believed to be particularly adaptable to fracturing operations wherein the underground formations are composed of soft calcareous matter such as the Annona Chalk formations in Louisiana. The method of the present invention will prevent and/or retard the closing up or healing of the fissures in such fractured calcareous formations.

The composition useful in the method of the present invention should meet certain requirements.

The said components of the composition should be of a U.S. Sieve Size between about 12 and 40 mesh to permit a good cement to be formed therewith and also to provide effective propping and/or to prevent sealing of the fissures. A mesh size between 20 and 40 mesh is preferred for excellent permeability without sacrificing desirable propping effects.

The sand component of the composition should be employed in an amount of 4 to 6 parts by weight per part by weight of the cement component. It has been found that a frac sand, i.e., one customarily used in fracturing, can also be used in the composition provided the mesh size is about 12 to 40 mesh.

The use of a graded sand with the large grains being not more than about twice the diameter of the smaller grains, i.e., 12 mesh to 20 mesh, 20 to 40 mesh, is preferred since premature bridging of the sand grains is likely to be avoided.

Sand particles coarser than 12 mesh and finer than 40 are unsuitable for use in the composition of the invention. The coarser particles are unsatisfactory because the set permeable cement will have a very low compressive strength. Very fine sand particles also are unsuitable because the fluid permeability of the set cement will be too low.

The cement component of the composition of the present invention should be present in the dry mixture in a ratio of about 1 part of cement to from 4 to about 6 parts by weight of sand on a weight basis. The cement component of the composition of the prevent invention may be any of the cements normally used in oil well cementing operations as well as plaster of Paris cement, sodium silicate cement, a silicophosphate cement or a pozzolan cement, a sorel cement or a litharge cement. It is preferred that the cement component be a light weight Portland cement having a density of about 75 lbs. per cubic foot and a chemical analysis approximately as follows: silicon dioxide 38.3%, aluminum oxide 13.0%, ferric oxide 5.2%, calcium oxide 35.7%, magnesium oxide 1.6% and sulfur trioxide 2.4%, with a loss on ignition of approximately 3.3%. This particular light weight Portland cement has been found to be most suitable in the composition of the present invention since permeable cements made from this cement are most stable against attack by the formation brines containing sodium chloride or sodium sulfate. Some other oil well cements are not as resistant to attack by formation brines or sulfate solutions and therefore are not as practical for use in the cement composition of the present invention. These other cements appear to lose some of their compressive strength and become eroded from contact with sodium chloride and sodium sulfate solutions. In contrast, the cements of the composition of the present invention are very resistant to erosion by sodium chloride or sodium sulfate solutions and do not lose their compressive strength even after prolonged exposure thereto.

The water component of the composition will vary with the type of cement and the sand mesh range. Satisfactory results are obtained with from about 0.60 to about 0.90 part of water per part by weight of cement, when 20 to 40 sand is used. Excess water may result in the separation of cement laden droplets of water from the sand whereas insufficient water may result in the separation of cement solids from the sand. In either case the formation may be damaged.

It has been found that the use of water containing salts such as sodium and/or calcium chloride are effective in preventing dispersions of the cement with oils containing surface active agents as the carrier medium. Desirably the salt concentration should approach a saturated solution at ambient temperature as the oil neutralization number approaches 1.0. Less than saturated salt solutions are used as the oil neutralization number decreased toward 0.3.

The oil neutralization number represents the amount in milligrams of 1 N potassium hydroxide required to neutralize 1 gram of the oil. Oils having a neutralization number below about 0.1 have been found to be most satisfactory.

The carrier medium for the sand-cement-water composition is a hydrocarbon oil. Suitable hydrocarbon oils include the kerosene and diesel oil fractions of a petroleum crude oil as well as crude oil. A diesel oil fraction is normally employed since such a fraction is relatively inexpensive and is usually readily available at or near the treatment site. The oil should be relatively free of surface active materials such as naphthenic acids which may displace water from sand and cement components. It has been found that the presence of surface active agents such as the naphthenic acids can be tolerated in the oil without adverse effects provided the neutralization number of the oil is not about about 0.3 without using a salt to offset the effect of the surface active agents. Sufficient of the hydrocarbon oil carrier medium is employed to suspend the composition therein. It has been found that the most satisfactory compositions have a composition density in the range of from 8 to 12 pounds per gallon and the amount of solids suspended or dispersed in the hydrocarbon oil can be in the range of from about 1 to 6 lbs. of the composition (sand, cement and water) per gallon of the hydrocarbon oil carrier medium.

The sand-cement-water fracturing composition can be prepared in the customary manner such as by mixing the components at the surface in a suitable vessel or in a mixing truck. The order of addition of the components is not critical.

The hydrocarbon carrier medium containing the suspended solids is pumped down the well bore and into the formation at rates which may vary with well conditions. Generally a rate of from about 10 to 40 barrels of the suspended solids in the carrier medium per minute is suitable to treat an interval. Such rates give satisfactory results and the resulting fluid permeable cement barrier formed in the formation has a sufficiently high compressive strength and sufficient permeability to permit the flow of formation fluids therethrough.

In the practice of this invention for the fracturing of underground formations to increase their fluid productivity and/or permeability, a fracturing fluid is placed in a well penetrating the formation to be fractured, optionally through the tubing, adjacent and in contact with the face of the formation to be fractured. If desired or required, packing is employed to isolate and confine the fracturing fluids to a portion of the well exposing the formation to be fractured. Pressure is then applied via the fracturing fluid so as to build up the pressure on the formation exposed to the fracturing fluid to a value great enough to cause formation to be fractured and form fissures therein.

The pressure required to fracture the formation varies from place to place depending upon the depth and/or the nature of the formation being fractured. Suitable fracturing pressures are in the range 1,000–15,000 p.s.i. and may be higher. When the formation fracturing pressure has been reached, the formation is fractured and the formed fissures provide additional areas for drainage of formation fluids.

Following is a description by way of example of the method of the present invention.

EXAMPLE I

A well penetrating the Annona Chalk formation in Louisiana was initially completed to a depth of 1,555 feet in open hole with 7-inch casing set at 1,458 feet. A 360° notch was cut in the casing at 1,444 feet with a hydro-jet tool preparatory to carrying out a fracture of the Annona Chalk formation behind the casing. The formation was fractured using 12,000 pounds of frac sand (8,000 pounds being of 10 mesh size and 4,000 pounds being of 20 mesh size) in 37,500 gallons of salt water. The pump rate was 42 barrels per minute and the pressure was 1,200 p.s.i. Thereafter, 1,400 pounds of the composition (composed of 1,047 pounds of sand, 20 to 40 mesh size, 196 pounds of Trinity Lite-Wate Cement, and 157 pounds of water) suspended in 4,660 gallons of kerosene was prepared and injection started into the fracture at a rate of 42 barrels per minute and a maximum pressure of 3,300 p.s.i. Before all of the composition was displaced into the fractured formation, the operation "locked up" due to high pressure apparently rupturing the casing. About 687 pounds of the composition remained in the casing and approximately 533 pounds were injected into the fracture. After the cement component of the composition had set and that portion thereof in the casing had been drilled out, the well was washed clean and then pumping equipment was installed at 1,440 feet. Production from the well averaged 7.7 barrels of oil per day. Over a 30-month period the well produced about three times the average of the other wells in this area.

This example demonstrates that the composition of the invention can be used as a "tailing in" composition in a fracturing operation.

EXAMPLE II

The composition can be used as the fracturing fluid in a primary fracturing operation. The composition is prepared by mixing about 5 parts of a frac sand having a mesh size of 20 to 40 mesh with 1 part by weight of a cement having the trade name Trinity Lite-Wate Cement and adding with stirring about 0.8 parts by weight of water. The composition of water-wet solids is suspended in a carrier medium such as kerosene or diesel oil in an amount of 1 to 6 pounds per gallon of carrier medium. The resulting suspension is pumped down the well bore until it is opposite the portion of the formation to be fractured. Sufficient pressure is applied thereto to cause fissures to be formed in the formation and some of the composition is forced thereinto. When a sufficient amount of the suspension is forced into the fissures the well is shut in until the cement sets and forms the fluid permeable barrier. Some of the composition, particularly the sand component, also acts as the propping agent.

We claim:

1. A method of preventing the closure of fissures in a hydrocarbon bearing underground fractured soft calcareous formation to permit the production of hydrocarbons from said formation, which comprises injecting a hydraulic fracturing fluid containing a propping agent down a bore hole communicating with said formation at a pressure sufficient to form fissures therein, injecting into said formed fissures a treating composition consisting essentially of cement, from 4 to 6 parts by weight of 12–40 mesh size sand, per part of cement, and from about 0.6 to about 0.9 parts by weight of water, per part of cement, said composition being suspended in a hydrocarbon oil carrier medium in an amount of from about 1 to 6 pounds, per gallon of said carrier medium, maintaining pressure on said composition for a predetermined period to permit the formation of a fluid permeable cement barrier in said formed fissures, whereby said hydrocarbons in said formation can be recovered through said formed permeable cement barrier.

2. In a method as defined in claim 1 wherein said carrier medium is selected from the group consisting of kerosene, diesel oil and crude oil.

3. In a method as defined in claim 1 wherein the propping agent is sand.

* * * * *

UNITED STATES PATENT OFFICE
CERTIFICATE OF CORRECTION

Patent No. 3,654,990      Dated April 11, 1972

Inventor(s) Bobby G. Harnsberger; Joy T. Payton

It is certified that error appears in the above-identified patent and that said Letters Patent are hereby corrected as shown below:

Col. 2, line 12    "said" should be --sand--

Col. 2, line 68    "20 to 40 sand" should be --20-40 mesh sand--
Col. 3, line 21    "about about" should be --above about--
Col. 4, line 15    "About 687" should be --About 867--

Signed and sealed this 15th day of May 1973.

(SEAL)
Attest:

EDWARD M. FLETCHER, JR.
Attesting Officer

ROBERT GOTTSCHALK
Commissioner of Patents